United States Patent
Chamberlin et al.

(10) Patent No.: US 10,516,320 B2
(45) Date of Patent: Dec. 24, 2019

(54) COOLING SYSTEM FOR AN ELECTRIC MOTOR

(71) Applicant: BorgWarner Inc., Auburn Hills, MI (US)

(72) Inventors: Bradley Duane Chamberlin, Pendleton, IN (US); Sven Norbert Altlay, Friesenheim (DE); Jomon Kaniampalackal, Hockenheim (DE); Clemens Burger, Nobelsville, IN (US); Timothy Jay Sailors, Jr., Nobelsville, IN (US)

(73) Assignee: BORGWARNER INC., Auburn Hills, MI (US)

(*) Notice: Subject to any disclaimer, the term of this patent is extended or adjusted under 35 U.S.C. 154(b) by 226 days.

(21) Appl. No.: 15/490,514

(22) Filed: Apr. 18, 2017

(65) Prior Publication Data
US 2017/0324305 A1   Nov. 9, 2017

Related U.S. Application Data

(60) Provisional application No. 62/333,376, filed on May 9, 2016.

(51) Int. Cl.
*H02K 9/19* (2006.01)
*H02K 5/20* (2006.01)

(52) U.S. Cl.
CPC .............. *H02K 9/19* (2013.01); *H02K 5/20* (2013.01)

(58) Field of Classification Search
CPC .......... H02K 9/19; F16D 25/123; F16D 27/14
USPC ........................................................... 310/54
See application file for complete search history.

(56) References Cited

U.S. PATENT DOCUMENTS

| | | | | |
|---|---|---|---|---|
| 3,060,335 A * | 10/1962 | Greenwald | .............. | H02K 9/19 310/43 |
| 3,080,774 A * | 3/1963 | Nickerson | ................. | F16H 3/60 192/113.36 |
| 4,262,224 A * | 4/1981 | Kofink | ................. | H02K 5/1735 310/416 |
| 5,519,269 A * | 5/1996 | Lindberg | ................. | H02K 9/19 310/58 |
| 6,579,202 B2 * | 6/2003 | El-Antably | .............. | B60K 6/26 184/6.12 |
| 7,397,154 B2 * | 7/2008 | Tilton | ...................... | H02K 5/18 310/53 |
| 7,834,492 B2 * | 11/2010 | Iund | ......................... | H02K 5/20 310/52 |
| 7,911,091 B2 * | 3/2011 | Takenaka | ............. | H02K 1/2766 310/156.57 |

(Continued)

*Primary Examiner* — Burton S Mullins
(74) *Attorney, Agent, or Firm* — Cantor Colburn LLP (57) ABSTRACT

A stator housing has an annular wall including a first end, a second end, an outer surface and an inner surface defining an interior cavity. A stator is arranged within the interior cavity. The stator includes an outer surface portion, a first end turn and a second end turn. A coolant annulus extends about at least a portion of the stator housing. The coolant annulus includes at least one coolant spray passage arranged to direct a spray of coolant at one of the first end turn and the second end turn. A coolant seal and distributor is coupled to the stator housing at the first end sealing against the stator. The coolant seal and distributor includes one or more coolant spray nozzles arranged to direct a spray of coolant onto the other of the first end turn and the second end turn.

12 Claims, 8 Drawing Sheets

(56) References Cited

U.S. PATENT DOCUMENTS

| | | | | |
|---|---|---|---|---|
| 8,129,874 B2* | 3/2012 | Lambka | ............ | H02K 5/20 |
| | | | | 310/53 |
| 8,169,110 B2* | 5/2012 | Swales | ............ | H02K 11/048 |
| | | | | 310/54 |
| 8,247,933 B2* | 8/2012 | Dang | ............ | H02K 1/20 |
| | | | | 310/54 |
| 8,487,489 B2* | 7/2013 | Palafox | ............ | H02K 3/24 |
| | | | | 310/52 |
| 8,513,840 B2* | 8/2013 | Chamberlin | ............ | H02K 5/20 |
| | | | | 310/52 |
| 8,552,603 B2* | 10/2013 | Minemura | ............ | H02K 9/19 |
| | | | | 310/52 |
| 8,629,586 B2* | 1/2014 | Minemura | ............ | H02K 9/19 |
| | | | | 310/112 |
| 8,692,425 B2* | 4/2014 | Creviston | ............ | H02K 9/19 |
| | | | | 310/58 |
| 8,823,223 B2* | 9/2014 | Han | ............ | H02K 5/20 |
| | | | | 310/54 |
| 9,041,260 B2* | 5/2015 | Ramey | ............ | H02K 5/20 |
| | | | | 310/52 |
| 9,054,565 B2* | 6/2015 | Fulton | ............ | H02K 9/19 |
| 2009/0102298 A1* | 4/2009 | Savant | ............ | H02K 5/20 |
| | | | | 310/52 |
| 2010/0175377 A1* | 7/2010 | Hippen | ............ | F02B 37/10 |
| | | | | 60/602 |
| 2011/0012447 A1* | 1/2011 | Himmelmann | ............ | H02K 7/006 |
| | | | | 310/54 |
| 2012/0091835 A1* | 4/2012 | Kim | ............ | B60K 6/26 |
| | | | | 310/54 |
| 2017/0271956 A1* | 9/2017 | Hanumalagutti | ............ | H02K 1/20 |

* cited by examiner

FIG. 10

COOLING SYSTEM FOR AN ELECTRIC MOTOR

CROSS-REFERENCE TO PRIOR APPLICATIONS

This application claims priority to U.S. Provisional Application No. 62/333,376, filed on May 9, 2016, the contents of which are expressly incorporated herein by reference in its entirety.

BACKGROUND OF THE INVENTION

Exemplary embodiments pertain to the art of electric motors, and more particularly, to a cooling system for an electric motor.

During operation, electrical energy flow develops heat in rotor and stator portions of an electric motor. Hybrid electric motors may develop additional heat through operation of one or more clutches. Heat can reduce operational performance and an overall operational life of an electric machine. In order to reduce heat buildup, coolant is typically passed through the electric motor. Coolant may take the form of a fluid such as air, water or oil.

BRIEF DESCRIPTION OF THE INVENTION

Disclosed is an electric machine including a stator housing having an annular wall including a first end, a second end, an outer surface and an inner surface defining an interior cavity. A stator is arranged within the interior cavity. The stator includes an outer surface portion, a first end turn and a second end turn. A coolant annulus extends about at least a portion of the stator housing. The coolant annulus includes at least one coolant spray passage arranged to direct a spray of coolant at one of the first end turn and the second end turn. A coolant seal and distributor is coupled to the stator housing at the first end sealing against the stator. The coolant seal and distributor includes one or more coolant spray nozzles arranged to direct a spray of coolant onto the other of the first end turn and the second end turn.

Also disclosed is an electric machine including a stator housing having an annular wall including a first end, a second end, an outer surface and an inner surface defining an interior cavity. The stator housing includes at least two alignment features. A stator arranged within the interior cavity. The stator includes an outer surface portion, a first end turn and a second end turn. The stator includes at least two alignment members cooperating with corresponding ones of the at least two alignment features to establish a desired position of the stator in the stator housing. A coolant reservoir is formed in the stator housing. A coolant annulus extends between one of the at least two alignment features and the at least two alignment members about a portion of the stator, the coolant annulus being fluidically connected to the coolant reservoir.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
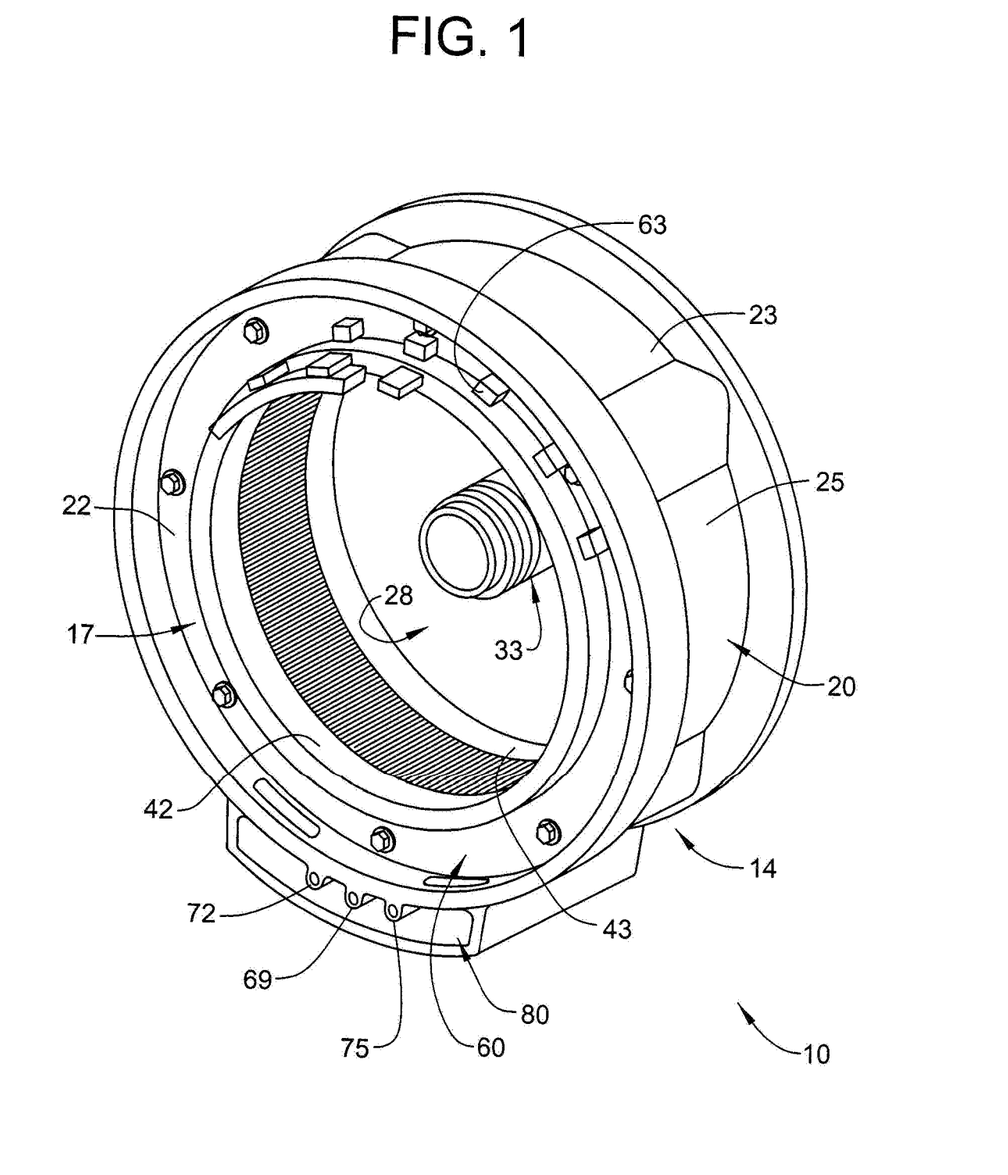
FIG. 1 depicts a portion of an electric machine including a stator housing and stator, in accordance with an exemplary embodiment.
Figure 2:
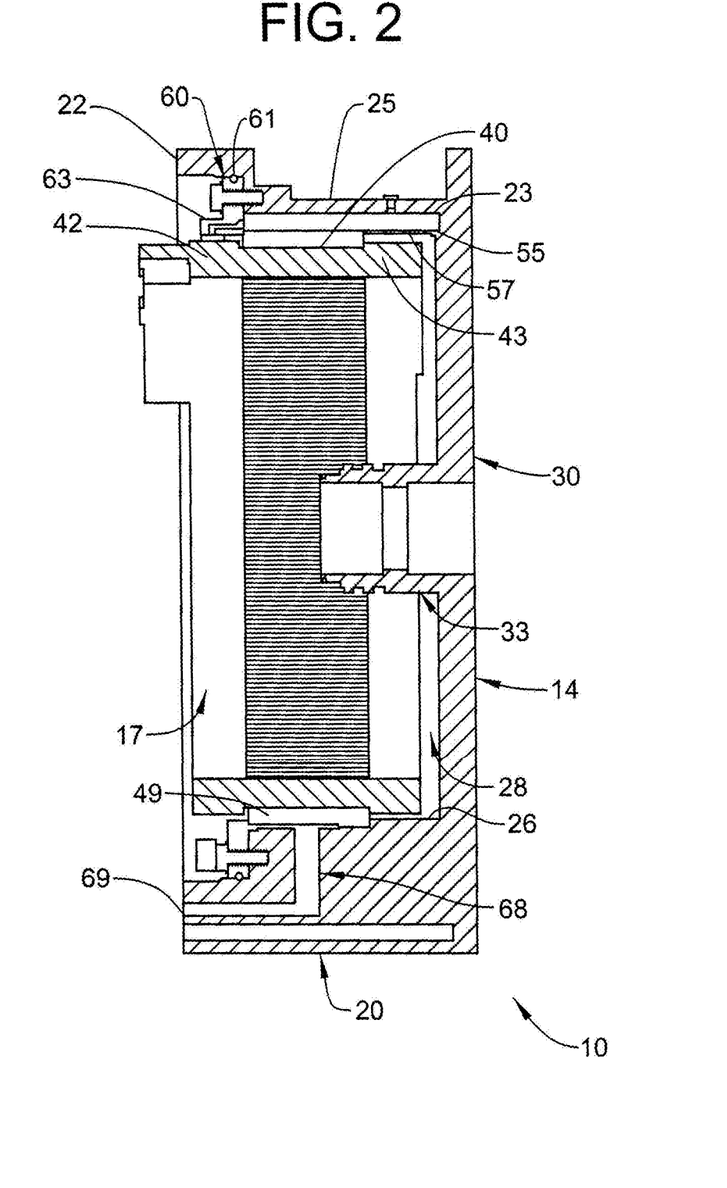
FIG. 2 depicts a cross-sectional side view of the stator housing and stator of FIG. 1 showing a stator cooling circuit, in accordance with an exemplary embodiment.

An electric machine, in accordance with an exemplary embodiment, is illustrated generally at 10 in FIGS. 1 and 2. Electric machine 10 includes a stator housing 14, a stator 17 and a rotor assembly (not shown). Stator housing 14 includes an annular wall 20 having a first end 22, a second end 23, an outer surface 25 and an inner surface 26. Annular wall 20 defines an interior cavity 28 and is coupled to an axial end wall 30 having a central rotor shaft support member 33.

Stator 17 includes an outer surface portion 40, a first end turn 42 and a second end turn 43. Stator 17 is arranged in stator housing 14 and spaced from inner surface 26 to define a coolant annulus 49 that receives coolant, such as oil, directed onto stator 17. Coolant annulus 49 may extend entirely about stator 17 or only a portion thereof. Coolant annulus 49 may be defined, in part, by a wall section 55 projecting axially outward of axial end wall 30. Wall section 55 may be provided with coolant spray passages, one of which is indicated at 57 that direct a spray of coolant at second end turn 43.

In accordance with an aspect of an exemplary embodiment, electric machine 10 includes a coolant seal and distributor 60 may be mounted to stator housing 14 about stator 17 through one or more mechanical fasteners (not separately labeled). Coolant seal and distributor 60 may be surrounded by a seal element 61 and maintains coolant within stator housing 14. Coolant seal and distributor 60 may be formed from injection molded plastic both with and without compression limiters or could also be formed from stamped metal. It is to be understood that the materials employed and method of forming coolant seal and distributer 60 may vary. Coolant seal and distributer 60 includes a first or outer surface (not separately labeled) and an opposing second or inner surface (also not separately labeled) that provides a desired seal at stator 17 to maintain coolant within stator housing 14. A plurality of coolant spray nozzles, one of which is indicated at 63 projects from the outer surface of coolant seal and distributor 60. Coolant spray nozzles 63 may be integrally formed with coolant seal and distributer 60 or could be formed as separate components formed by casting, machining, molding and the like. Coolant spray nozzles 63 may be formed from various materials including plastics, metals and the like. It is to be understood that the materials employed and method of forming coolant spray nozzles 63 may vary. Coolant spray nozzles 63 direct coolant onto first end turn 42.

In further accordance with an exemplary embodiment, stator housing 14 includes a stator coolant passage 68 having a stator coolant inlet 69 that delivers coolant into coolant annulus 49. The coolant flows into coolant annulus 49 and is directed in a heat exchange relationship onto first and second end turns 42 and 43. Coolant in coolant annulus 49 may also pass in a heat exchange relationship with outer surface portion 40. The coolant may circulate about outer surface portion 40 and be sprayed onto first and second end turns 42 and 43 to reduce stator operating temperatures and improve an overall reliability and service life of electric machine 10.

Figure 3:
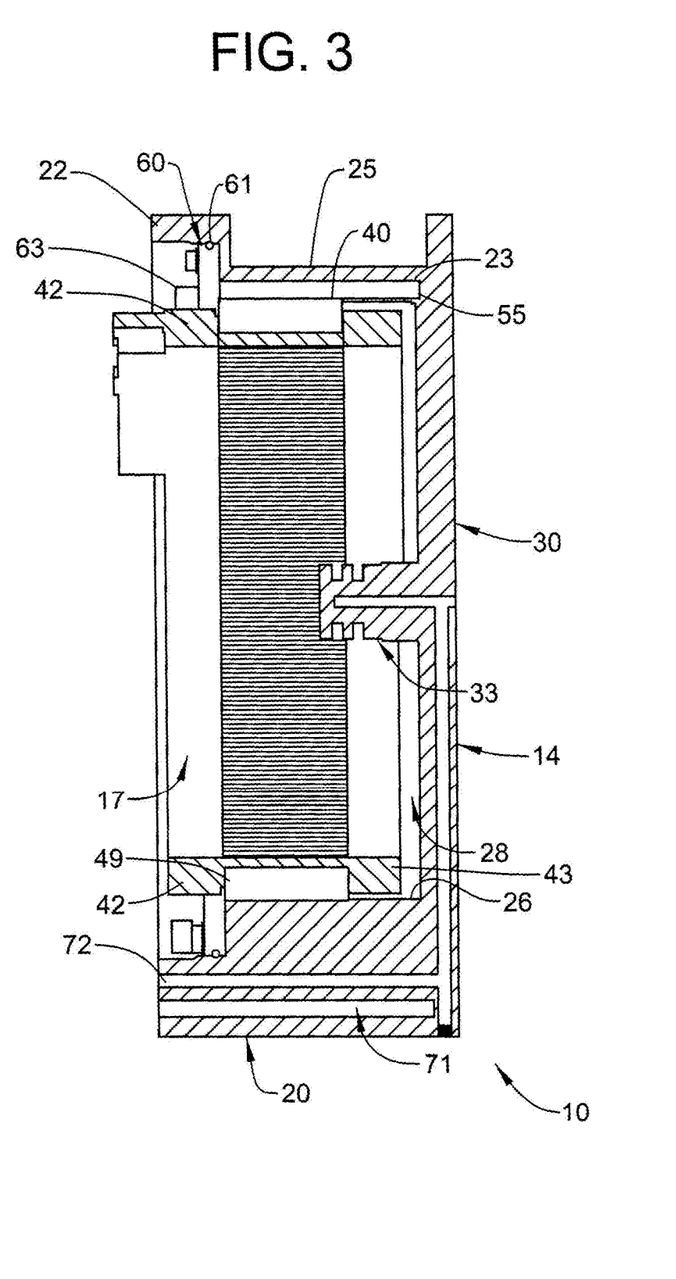
FIG. 3 depicts a cross-sectional side view of the stator housing and stator of FIG. 1 showing a first fluid feed circuit, in accordance with an exemplary embodiment.
Figure 4:
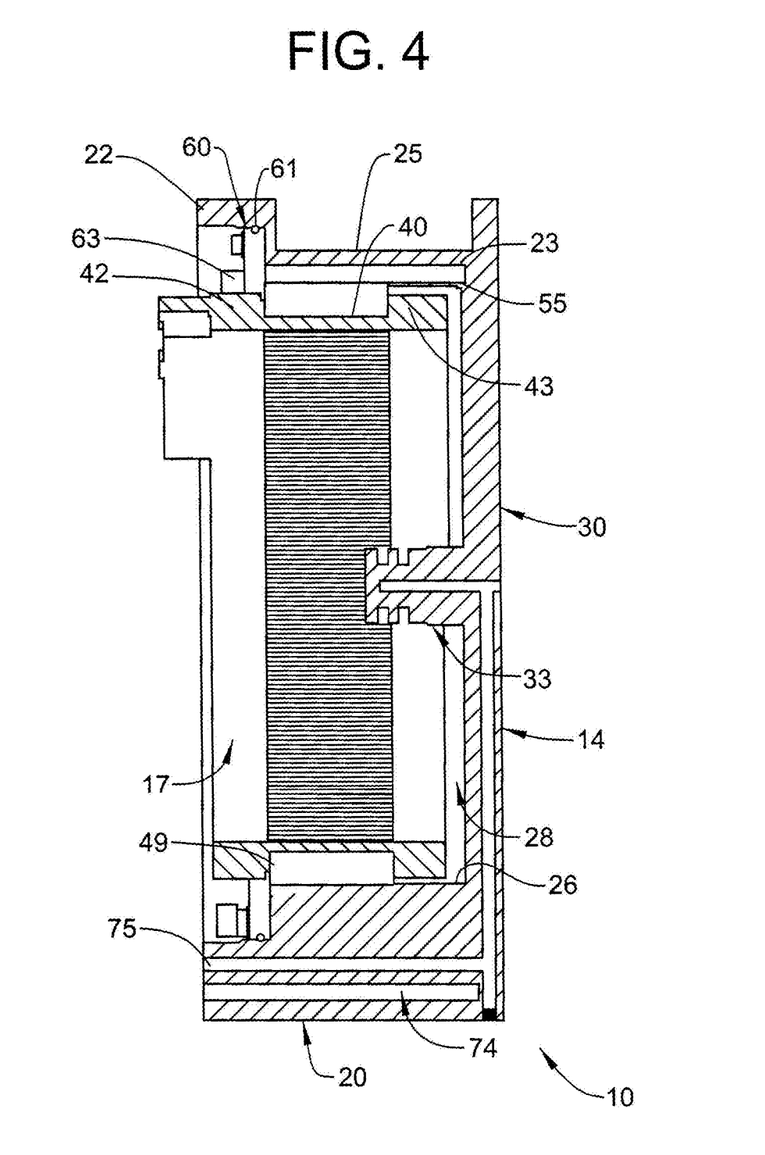
FIG. 4 depicts a cross-sectional side view of the stator housing and stator of FIG. 1 showing a second fluid feed circuit, in accordance with an exemplary embodiment.

In accordance with an aspect of an exemplary embodiment illustrated in FIGS. 3 and 4, stator housing 14 includes a clutch assembly coolant passage 71 having a clutch assembly coolant inlet 72. Stator housing 14 also includes a clutch assembly hydraulic passage 74 having a clutch assembly hydraulic inlet 75. Clutch assembly coolant passage 71 and clutch assembly hydraulic passage 74 deliver coolant and hydraulic fluid respectively to one or more clutch assemblies (not shown) carried by the rotor.

Figure 5:
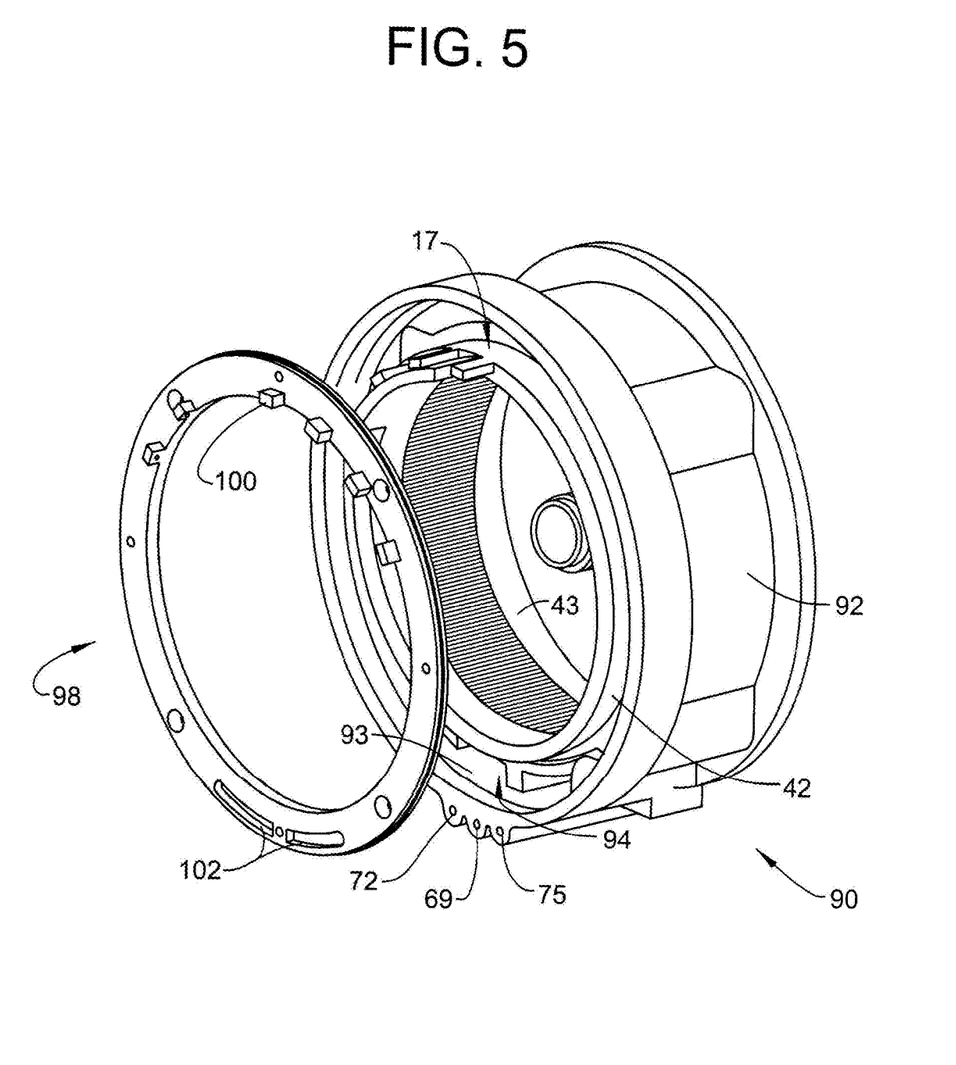
FIG. 5 depicts a stator housing and stator, in accordance with another aspect of an exemplary embodiment.

In accordance with an exemplary aspect shown, stator housing 14 includes a coolant drain 80 arranged radially outwardly of outer surface 25. Also shown, each of the stator coolant inlet 69, clutch assembly coolant inlet 72 and clutch assembly hydraulic inlet extend through coolant drain 80. However, it should be understood that coolant drain may take on other forms. As shown in FIG. 5, a stator housing 90 in accordance with an aspect of an exemplary embodiment, includes an outer surface 92, an inner surface 93 and a coolant drain 94 arranged radially inwardly of inner surface 93. A coolant seal and distributor 98 extends over coolant drain 94. Coolant seal and distributor 98 may be formed in a manner similar to that described above and may include a plurality of coolant spray nozzles, one of which is indicated at 100, and a pair of drain openings, one of which is indicated at 102. Drain openings 102 are fluidically connected with coolant drain 94. It is to be understood that the number and location of drain openings 102 may vary.

Figure 6:
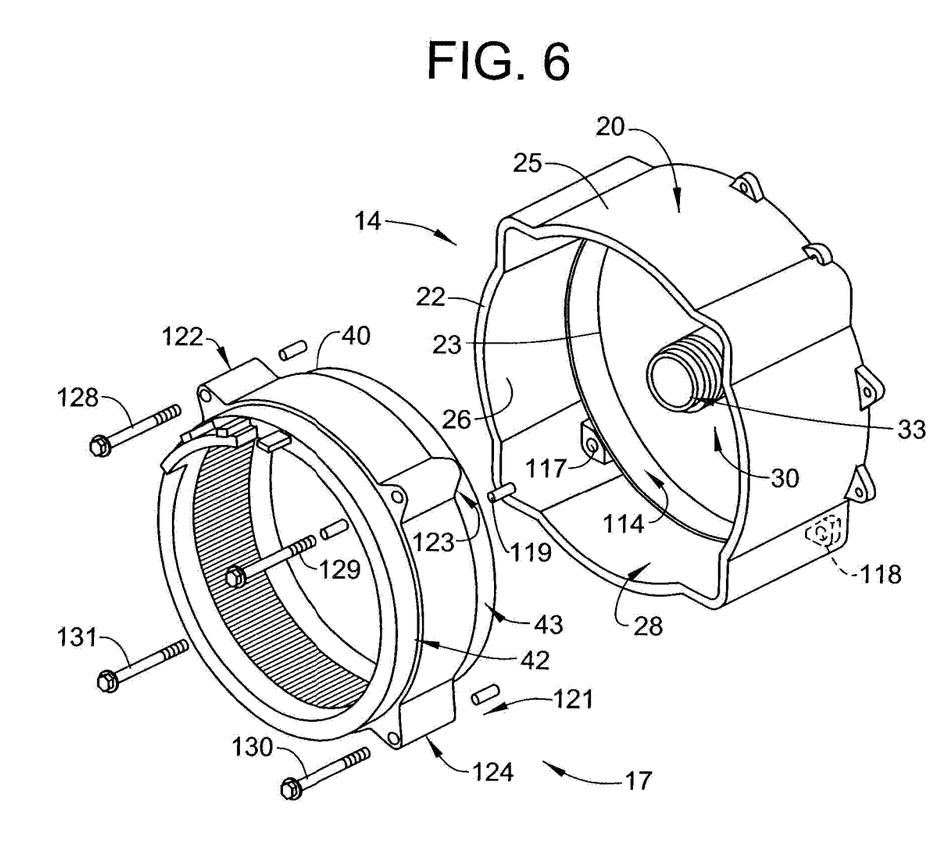
FIG. 6 depicts a disassembled view of a stator housing and stator, in accordance with another aspect of an exemplary embodiment.

As seen in FIG. 6, stator housing 14 includes a plurality of alignment features 114. Alignment features 114 take the form of a first opening 117, a second opening 118 as well as additional openings (not shown). A bushing, such as indicated at 119, may extend into first opening 117 to provide a desired position or alignment for stator 17. It is to be understood that additional bushings (not separately labeled) may be employed at each alignment feature. It is also to be understood that the number, location and type of alignment features may vary.

Figure 7:
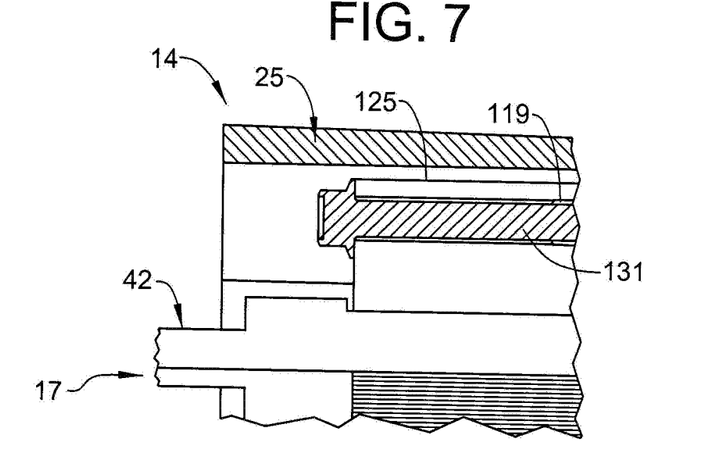
FIG. 7 depicts a detailed view of a mounting arrangement for the stator and stator housing of FIG. 6.

Stator 17 includes a number of alignment members 121 that may register or align with the plurality of alignment features 114 in stator housing 14. Alignment members 121 may take the form of a first mounting ear 122, a second mounting ear 123, a third mounting ear 124 and a fourth mounting ear 125 (FIG. 7). Each mounting ear 122-125 includes a corresponding opening (not separately labeled) receptive of a corresponding first mechanical fastener 128, second mechanical fastener 129, third mechanical fastener 130 and fourth mechanical fastener 131. As shown in FIG. 7, bushing 119 is received in fourth mounting ear 125. Fourth mechanical fastener extends through fourth mounting ear 125 and bushing 119 engaging with first opening 117. That is, first opening 117 may include threads (not shown) that cooperate with corresponding threads (not separately labeled) on fourth mechanical fastener 131 to locate and secure stator 17 within stator housing 14.

Figure 8:
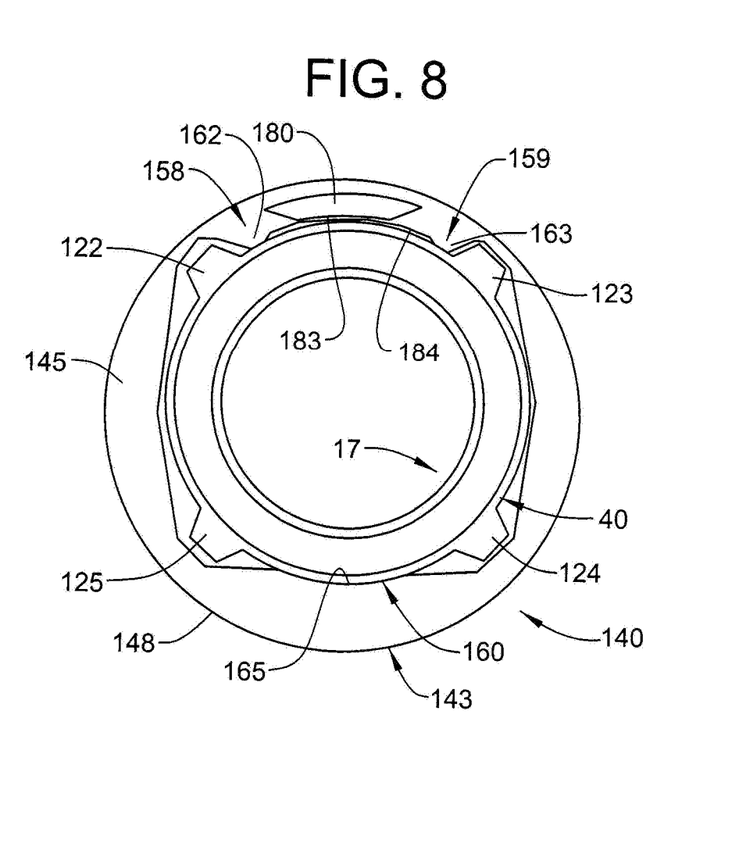
FIG. 8 depicts a plan view of a stator housing and stator, in accordance with an aspect of an exemplary embodiment.
Figure 9:
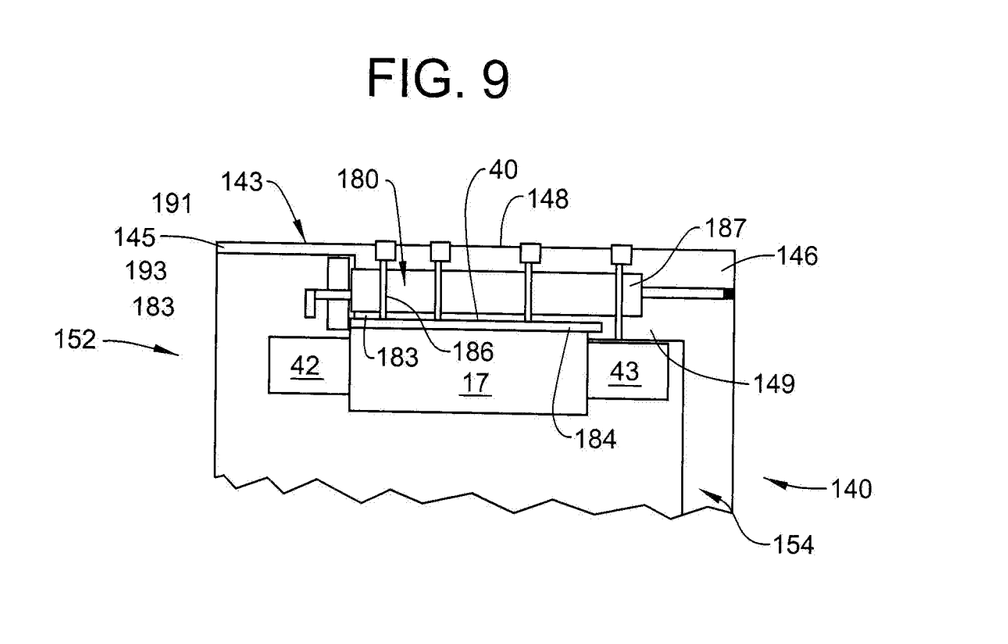
FIG. 9 depicts a partial cross-sectional view of the stator housing and stator of FIG. 8, in accordance with an aspect of an exemplary embodiment.

Reference will now follow to FIGS. 8-9 in describing a stator housing 140 in accordance with another aspect of an exemplary embodiment. Stator housing 140 includes an annular wall 143 having a first end 145, a second end 146, an outer surface 148 and an inner surface 149 defining an interior cavity 152. Stator housing 140 further includes an axial end wall 154 which may support a rotor shaft support member (not shown). Stator housing 140 includes a first alignment member 158, a second alignment member 159 and a third alignment member 160. First and second alignment members 158 and 159 take the form of first and second projections 162 and 163 that extend radially inwardly of inner surface 149. Third alignment member 160 may take the form of a recess 165 that extends into inner surface 149. Alignment members 158-160 receive outer surface portion 40 of stator 17 to establish a desired position or alignment relative to stator housing 140.

Stator housing 140 also includes a coolant reservoir 180. Coolant reservoir 180 may be cast or may be machined into stator housing 140. Coolant reservoir 180 may include a wall section 183 that defines, at least in part, a coolant annulus 184. Wall section 183 may include one or more coolant spray passages 186 that deliver coolant into a coolant annulus 184 and onto outer surface portion 40 and at last one coolant spray passage 187 that delivers coolant onto second end turn 43 of stator 17 in a manner similar to that described above. In accordance with an aspect of an exemplary embodiment, coolant annulus 184 only extends between first and second projections 162 and 163. It is to be understood that coolant annulus 184 may take on other configurations.

Figure 10:
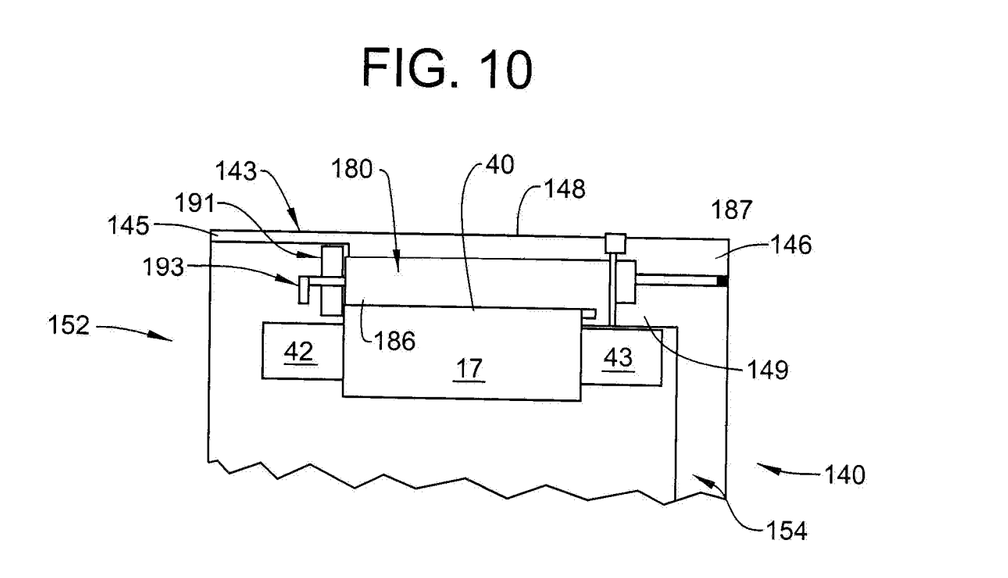
FIG. 10 depicts a partial cross-sectional view of a stator housing and stator, in accordance with another aspect of an exemplary embodiment

Stator housing 140 may also include a coolant seal and distributor 191 having a plurality of coolant spray passages, one of which is indicated at 193 that direct coolant onto first end turn 42. It is to be understood that coolant reservoir 180 may be formed by various techniques. It is also to be understood coolant reservoir may be formed without a wall section as shown in FIG. 10. In FIG. 10 coolant is in direct contact with outer surface portion 40 of stator 17.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
a stator housing including an annular wall including a first end, a second end, an outer surface and an inner surface defining an interior cavity, wherein the stator housing includes an axial end wall at the second end, the axial end wall including a rotor shaft support member;
a stator arranged within the interior cavity, the stator including an outer surface portion, a first end turn and a second end turn;
a coolant annulus extending about at least a portion of the stator housing, the coolant annulus including at least one coolant spray passage arranged to direct a spray of coolant at one of the first end turn and the second end turn;
a stator coolant passage extending through the stator housing fluidically connected to the coolant annulus;
a clutch assembly coolant passage extending through the stator housing and the rotor shaft support member; and
a coolant seal and distributor coupled to the stator housing at the first end sealing against the stator, the coolant seal and distributor including one or more coolant spray nozzles arranged to direct a spray of coolant radially inwardly onto the other of the first end turn and the second end turn.

2. The electric machine according to claim 1, wherein the coolant annulus extends substantially entirely about the annular wall.

3. The electric machine according to claim 1, further comprising: a clutch assembly hydraulic passage extending through the stator housing and the rotor shaft support member.

4. The electric machine according to claim 3, wherein the stator coolant passage includes a stator coolant inlet, the clutch assembly coolant passage includes a clutch assembly coolant inlet, and the clutch assembly hydraulic passage includes a clutch assembly hydraulic inlet.

5. The electric machine according to claim 4, wherein each of the stator coolant inlet, the clutch assembly coolant inlet, and the clutch assembly hydraulic inlet are arranged radially outwardly of the annular wall.

6. The electric machine according to claim 4, further comprising: a coolant drain arranged radially outwardly of the annular wall.

7. The electric machine according to claim 6, wherein each of the stator coolant inlet, the clutch assembly coolant inlet, and the clutch assembly hydraulic inlet extend through the coolant drain.

8. The electric machine according to claim 1, further comprising: a coolant drain arranged radially inwardly of the annular wall.

9. The electric machine according to claim 8, wherein the coolant seal and distributor includes an opening fluidically connected with the coolant drain.

10. The electric machine according to claim 1, wherein the stator includes at least two alignment members, the at least two alignment members including a first mounting ear and a second mounting ear.

11. The electric machine according to claim 10, wherein the stator housing includes at least two alignment features, the at least two alignment features including a first opening positioned to align with the first mounting ear and a second opening positioned to align with the second mounting ear.

12. The electric machine according to claim 11, further comprising: a first bushing arranged in the first opening and a second bushing arranged in the second opening, the first bushing and the second bushing being receptive of first and second mechanical fasteners passing through corresponding ones of the first and second mounting ears.

* * * * *